Feb. 22, 1966 F. N. NEWCOMB 3,236,153
HYDRAULIC DAMPING MECHANISM FOR A MOUNT
Filed May 20, 1964 2 Sheets-Sheet 1
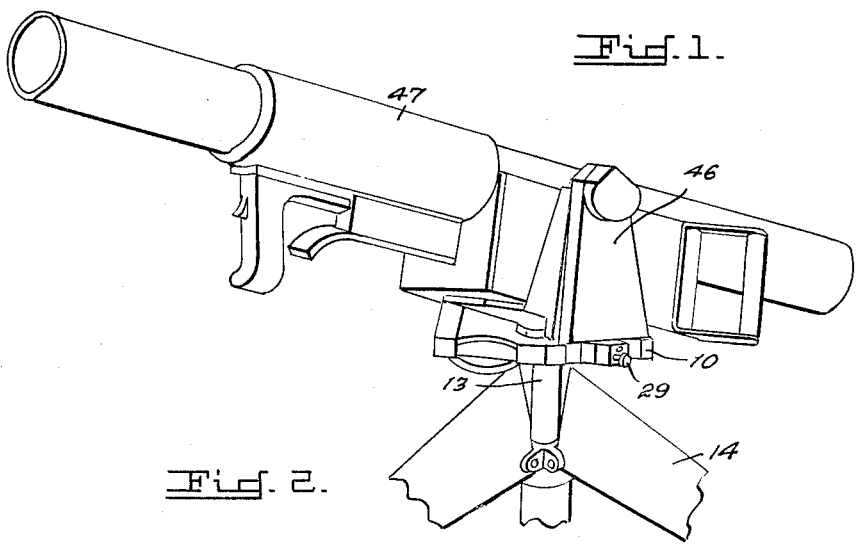
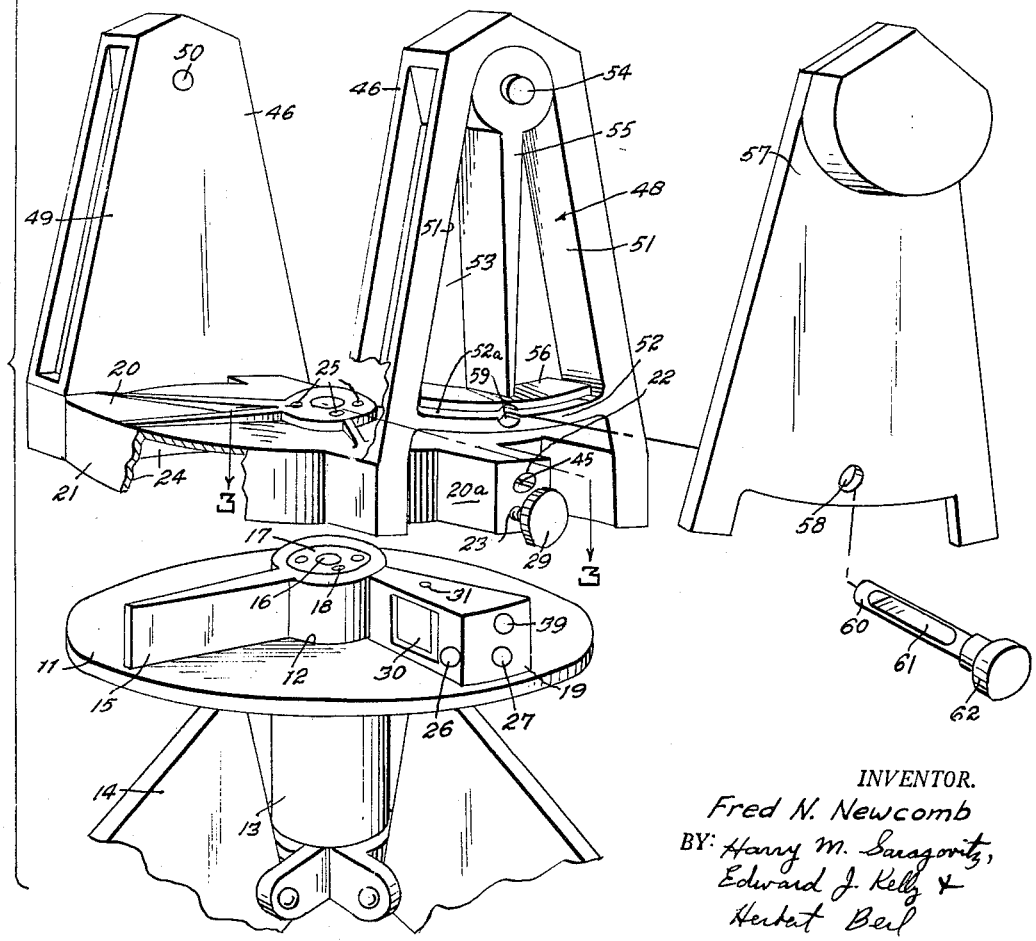
INVENTOR.
Fred N. Newcomb
BY: Harry M. Saragovitz,
Edward J. Kelly &
Herbert Berl Feb. 22, 1966     F. N. NEWCOMB     3,236,153
HYDRAULIC DAMPING MECHANISM FOR A MOUNT
Filed May 20, 1964     2 Sheets-Sheet 2
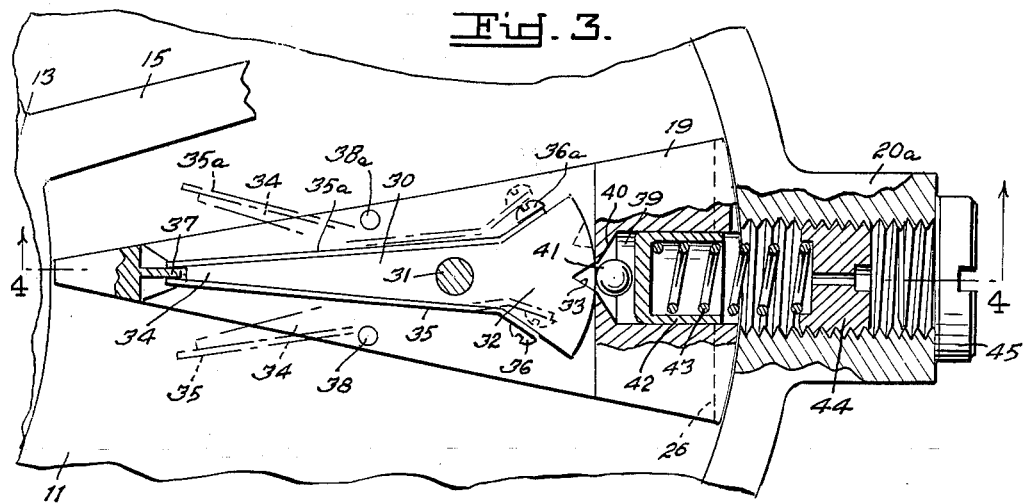
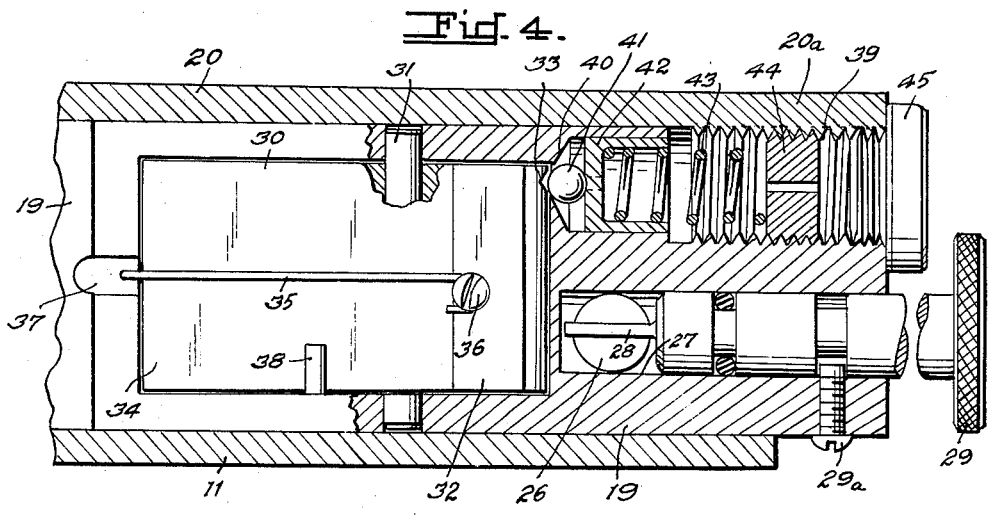
INVENTOR.
Fred N. Newcomb
BY: Harry M. Saragovitz,
Edward J. Kelly &
Herbert Berl

United States Patent Office 3,236,153
Patented Feb. 22, 1966

3,236,153
HYDRAULIC DAMPING MECHANISM
FOR A MOUNT
Fred N. Newcomb, Kingsville, Md., assignor to the United States of America as represented by the Secretary of the Army
Filed May 20, 1964, Ser. No. 369,043
7 Claims. (Cl. 89—37)
(Granted under Title 35, U.S. Code (1952), sec. 266)

The invention described herein may be manufactured and used by or for the Government for governmental purposes without the payment to me of any royalty thereon.

My invention relates to a hydraulic damping mechanism for use in mounts for rocket launcher, camera and the like.

It is a primary object of my invention to provide a mount which will provide a smooth, controlled resistance to an operator's muscular efforts while he tracks a moving object.

Another object of my invention is to provide a mount which a single man can move simultaneously in elevation and azimuth without using handwheels or mechanical power.

A further object of my invention is to furnish a damping mechanism for a mount having no externally mounted damper mechanism.

Still another object of my invention is to provide a damping mechanism for a mount which will automatically and instantly reduce torque when rapid rotation of the mount is required by the operator and will instantly and automatically switch back to the original setting when such motion is reduced in velocity.

Other objects and advantages of my invention will be apparent during the course of the following description.

In the accompanying drawings, forming a part of this application, and in which like numerals are employed to designate like parts throughout the same:

FIGURE 1 is a perspective fragmentary view of my invention mounted on a tripod and utilizing a rocket launcher;

FIGURE 2 is a perspective view of my invention showing the elevation and azimuth damping mechanism;

FIGURE 3 is a cross sectional view taken substantially on line 3—3 of FIGURE 2; and FIGURE 4 is a cross sectional view taken substantially on line 4—4 of FIGURE 3.

In the drawing wherein for the purpose of illustration is shown a preferred embodiment of my invention, the numeral 10 indicates the azimuth damper housing generally which comprises a rotating bottom plate 11 having a centrally disposed opening 12 therethrough. A vertical tube 13 which is the upper portion of the tripod 14 extends through the opening 12 and projects above the bottom plate 11. A vane 15 is integral with the upper portion of the tube 13. Inside of and concentric with the vertical tube 13 is a vertical pintle 16 about which the azimuth damper housing 10 rotates. The upper portion of the pintle 16 is provided with a ball bearing race 17 having threaded openings 18 therein. A sector shaped rapid traverse member 19 is secured by any suitable means to the upper surface of the bottom plate 11.

The cover 20 of the housing 10 has a downwardly depending flange 21 with a threaded hole 22 and an unthreaded hole 23 in a vertical alignment in an outwardly projecting portion 20a thereof. The bottom portion of the flange 21 carries a gasket 24. Openings 25 are provided in the upper surface of the cover 20 which register with the openings 18 in the ball bearing race 17. The cover 20 is secured to the bottom plate 11 by screws (not shown) which extend through the openings 25 and 18.

A fluid (not shown) such as oil or silicone fluid is contained in the fluid tight housing 10.

Turning now to the rapid traverse member 19, as best seen in FIGURES 3 and 4, an orifice 26 is provided at one end and is intersected perpendicularly by the cylindrical passageway 27. A damper type valve 28 controls the opening and closing of the orifice 26 and seats in the passageway 27. A conventional operating knob 29 is provided at the free end of the valve 28. The valve 28 is maintained in a fixed position by the set screw 29a. A relief valve gate 30 is pivotally secured off center within the sector shaped traverse member 19 by the pin 31. The gate 30 has an enlarged arcuate head 32 with a vertical V-shaped groove 33 centrally disposed in the front portion thereof, and a tapered trailing portion 34. Leaf springs 35, 35a are secured to both sides of the head 32 by any suitable means such as screws 36, 36a and extend beyond the trailing portion 34 of the gate 30. The rapid traverse member 19 is provided with a stop member 37 adjacent the trailing portion 34 of the gate 30 for the springs 35 and 35a, and with gate stop studs 38, 38a spaced from either side of the gate 30. A second cylindrical passageway 39 internally threaded at its outer end is provided in the rapid traverse member 19 and is tapered as at 40 to intersect the V-shaped groove 34. A ball 41 is positioned in the passageway 39 to engage the groove 34. The ball 41 is held by the shell 42 which seats the spring 43. An adjusting screw 44 holds the spring 43 in position, and the passageway 39 is closed by the fluid seal screw 45.

The holes 22 and 23 in the flange 21 of the cover 20 register with the passageways 27 and 39 in the rapid traverse member 19.

Positioned on the upper surface of the cover 20 are two A frame brackets 46, 46a between which a rocket launcher 47 may be pivotally secured by any suitable means. The brackets 46, 46a contain an elevation damper device generally indicated at 48 which includes a back plate 49 having an opening 50 in its upper portion, the inner walls 51 of the brackets 46, 46a and an arcuate bottom 52 forming a fluid tight chamber 53. A pin 54 is positioned in the opening 50 upon which a vane 55 is pivotally mounted. Secured to the back plate 49 adjacent the lower portion of the vane 55 and spaced above the arcuate bottom 52 is an arcuate plate 56. The plate 56 is also spaced from the inner walls 51 and conforms to the configuration of the arcuate bottom 52 to provide a by-pass channel 52a. Cover plates 57, 57a having openings 58 in their lower portions are secured to the brackets 46, 46a by any suitable means. An enlarged opening 59 to the by-pass channel 52a is provided between the arcuate bottom 52 and the arcuate plate 56 which registers with the opening 58 to receive a torque control valve 60 having a slot 61 and a conventional operating knob 62. The chamber 53 is filled with a fluid such as oil or silicone fluid (not shown).

In operation, the rocket launcher 47, or a camera or the like, is secured for vertical movement between the brackets 46, 46a. The azimuth damper housing 10 containing the stationary vane 15, the silicone fluid and the rapid traverse member 19 rotates about the vertical pintle 16 as the operator tracks an object. Rotation of the damper is retarded by the differential pressure created by the displacement of the fluid from one side of the rapid traverse member 19 to the other side through the orifice 26. Adjustability of the orifice 26 is obtained by the rotational position of the damper type valve 28. When the operator moves the device faster, the fast transverse action is obtained by rapidly increasing the size of the fluid opening within the rapid traverse member 19. This is accomplished by the opening of the relief valve gate 30. The gate 30 is hinged off center by the pin 31 so that the differential pressure of the fluid tries to open the gate 30 either to the right or left depending on the direction of rotation of the housing 10 until it hits the studs 38 or 38a as shown in dotted lines in FIGURE 3. The gate 30 is normally held in a closed position by the action of the spring loaded ball 41 which seats in the groove 33 provided in the head portion 32 of the gate 30, and by the action of the closing springs 35, 35a. The load on the ball 41, hence the torque applied to the azimuth damper housing 10 in order to actuate the rapid traverse member 19, is adjusted by removing the fluid seal screw 45 and turning the adjusting screw 44 thereby applying more load on the spring 43. Upon cessation of rapid traverse, the closing springs 35, 35a return the gate 30 to the closed position allowing the ball 41 to fall into the groove 33.

In the elevation damper 48, the vane 55 rotates within the compartment 53 and displaces the fluid through the by-pass channel 52a and the slot 61 in torque control valve 60. Since the elevational system moves through only 30° a fast traverse mechanism was not included. It could be applied to the elevation system in a manner similar to that of the azimuth mechanism.

It is to be understood that the form of the invention herewith shown and described is to be taken as a preferred embodiment of same, and that various changes in the shape, size, and arrangement of parts may be resorted to without departing from the spirit of my invention or the scope of the subjoined claims.

I claim:

1. In a hydraulic damping device for use in a mount for a rocket launcher or the like including a rotatable azimuth damper housing, a vertical pintle about which the housing rotates, a non-rotating vane secured to said pintle within said housing, a rapid traverse member having an opening therein secured in said housing and having an orifice extending therethrough, valve means adjusting the size of said orifice; the improvement comprising a relief valve gate pivotally mounted in said opening of said rapid traverse member to permit lateral swinging movement in two directions, means holding said gate in a closed position prior to a sudden rush of fluid, means limiting the swinging outward movement of said gate, and means returning said gate to the closed position from either of the two directions when the rush of fluid subsides.

2. In a hydraulic damping device for use in a mount for a rocket launcher or the like including a rotatable azimuth damper housing, a vertical pintle about which the housing rotates, a non-rotating vane secured to said pintle within said housing, a sector shaped rapid traverse member secured in said housing having an adjustable orifice extending therethrough; the improvement comprising a relief valve gate, means pivotally mounting said gate in said rapid traverse member to permit lateral swinging movement, said gate having an enlarged head portion, said head portion having a vertical groove therein, a spring loaded ball check valve engaging said groove to hold said gate in a closed position prior to a sudden rush of fluid, and means returning said gate to the closed position when the rush of fluid subsides.

3. The structure of claim 2, and means adjusting the tension of said spring loaded ball check valve.

4. The structure of claim 2, and means limiting the swinging outward movement of said gate.

5. In a hydraulic damping device for use in a mount for a rocket launcher or the like including a rotatable azimuth damper housing, a vertical pintle about which the housing rotates, a non-rotating vane secured to said pintle within said housing, a rapid traverse member secured in said housing having an adjustable orifice extending therethrough; the improvement comprising a relief valve gate, means pivotally mounting said gate in said rapid traverse member to permit lateral swinging movement, said gate comprising an enlarged arcuate head portion and a tapered trailing portion, said head portion having a vertical groove therein, a spring loaded ball check valve engaging said groove to hold said gate in a closed position prior to a sudden rush of fluid, a stop member provided by said rapid traverse member adjacent said trailing portion of said gate, and a leaf spring secured to each side of said enlarged head portion and extending beyond said trailing portion to engage said stop member and return said gate to the closed position when the rush of fluid subsides.

6. The structure of claim 5, wherein gate stop studs are spaced from either side of the gate to limit the outward movement thereof.

7. A mount for a rocket launcher or the like comprising a rotatable hydraulic azimuth damper housing, a vertical pintle about which the housing rotates, a non-rotating vane secured to said pintle within said housing, a rapid traverse member secured in said housing having an orifice extending therethrough, a relief valve gate pivotally mounted in said rapid traverse member to permit lateral swinging movement, means holding said gate in a closed position prior to a sudden rush of fluid, means returning said gate to the closed position when the rush of fluid subsides, a hydraulic elevation damper mounted on the upper surface of the azimuth damper housing comprising a pair of brackets between which a rocket launcher may be pivotally secured, said brackets having fluid tight chambers therein, a vane pivotally mounted within said chamber, an arcuate plate spaced from the bottom of said chamber adjacent the lower portion of said vane providing a by-pass channel, and valve means in said by-pass channel to adjust the flow of fluid in said chamber.

References Cited by the Examiner

UNITED STATES PATENTS

| | | | |
|---|---|---|---|
| 1,130,375 | 3/1915 | Cheney | 188—93 |
| 2,430,636 | 11/1947 | Gould | 89—1.7 |
| 2,717,138 | 9/1955 | Sheehan | 248—183 |

BENJAMIN A. BORCHELT, *Primary Examiner.*

SAMUEL W. ENGLE, *Examiner.*